United States Patent [19]

Satran et al.

[11] Patent Number: 5,129,767
[45] Date of Patent: Jul. 14, 1992

[54] METAL CUTTING TOOL

[75] Inventors: Amir Satran, Kfar Havradim; Carol Smilovici, Acre, both of Israel

[73] Assignee: Iscar Ltd., Tefen, Israel

[21] Appl. No.: 651,305

[22] Filed: Feb. 6, 1991

[30] Foreign Application Priority Data

Feb. 19, 1990 [GB] United Kingdom ............... 9003697

[51] Int. Cl.⁵ ..................... B26D 1/12; B23P 15/28
[52] U.S. Cl. ........................ 407/40; 407/47; 407/104
[58] Field of Search ............. 407/33, 40, 41, 46–48, 407/101, 102, 103, 104, 105

[56]  References Cited

U.S. PATENT DOCUMENTS

| | | | |
|---|---|---|---|
| 3,246,382 | 4/1966 | Zierden | 407/101 X |
| 3,323,192 | 6/1967 | Gustafson | 407/103 X |
| 4,011,049 | 3/1977 | McCreery | 407/103 |
| 4,202,650 | 5/1980 | Erickson | 407/46 |
| 4,329,091 | 5/1982 | Erkfritz | 407/41 |
| 4,470,732 | 9/1984 | Lindsay | 407/104 |

FOREIGN PATENT DOCUMENTS

| | | | |
|---|---|---|---|
| 0629006 | 9/1978 | U.S.S.R. | 407/103 |
| 0844130 | 7/1981 | U.S.S.R. | 407/103 |

*Primary Examiner*—Larry I. Schwartz
*Assistant Examiner*—Julie R. Daulton
*Attorney, Agent, or Firm*—Burgess, Ryan & Wayne

[57]  ABSTRACT

A metal cutting tool having a tool holder and a pocket formed in the tool holder in which an insert is to be replaceably retained, there being formed in the tool holder an elongated tubular recess which opens into the pocket and there being furthermore provided a replaceable element having a split tubular coupling portion formed integrally therewith so as to be insertable upon spring-like compression into the tubular recess. This replaceable element is preferably constituted by an insert seating shim.

13 Claims, 8 Drawing Sheets

METAL CUTTING TOOL

FIELD OF THE INVENTION

This invention relates to a metal cutting tool consisting of a tool holder and at least one cutting insert releasably retained within a pocket formed in the tool holder.

BACKGROUND OF THE INVENTION

With such a cutting tool, the or each cutting insert is releasably retained in a respective pocket formed in a tool holder by, for example, a clamping screw which extends through a central hole formed in the insert into an appropriate tapped bore formed in the tool holder or, alternatively, by some other suitable clamping system. In many cases, a metal shim is interposed between the insert and the bottom wall of the tool holder pocket, this shim serving to protect the tool holder proper from excessive wear or damage through use. Additionally, shims of differing heights can be employed so as to vary as required the specific location of the cutting insert with respect to the tool holder and in particular that of the cutting edge. In most cases where such shims are employed with screw bolted inserts, the shim is retained in position in the pocket by means of the same screw used to secure the insert, which screw passes through an aperture formed in the shim aligned with the bore of the insert. It will be readily appreciated that this method of securing the shim to the tool holder is inconvenient, particularly in view of the fact that during replacement of an insert, the shim is no longer secured to the holder and can either become lost or forgotten when the operator may forget to replace the shim.

In order to overcome this problem, and also to ensure that the shim is effectively secured to the tool holder even when the insert is retained by means other than a through-going bolt, it has been proposed, particularly in connection with milling tools, to retain the shim in position with respect to the tool holder quite independently of the releasable retention of the insert, and this by means of a special retaining pin which is inserted into the tool holder and retains the shim in position. It has been found in practice, however, that the retaining pin often becomes broken and this in itself can have undesirable consequences in the use of the cutting tool. Additionally, with shims so retained, difficulties are often encountered in releasing the shim for replacement and such replacement may become time consuming.

BRIEF SUMMARY OF THE INVENTION

It is an object of the present invention to provide a metal cutting tool with new and improved means for the retention thereon of the insert seating shim.

It is an object of the present invention to provide a metal cutting tool with new and improved means for the retention thereon of a replaceable cutting insert.

As used in the present specification, the term "replaceable element" shall be deemed to include both the replaceable cutting insert and also a replaceable insert shim where such is provided.

According to the present invention there is provided a metal cutting tool comprising a tool holder; a pocket in said tool holder defined by a pair of side walls and base walls; an elongated, tubular recess formed in said tool holder and opening into said pocket; a replaceable element having outer, base and side surfaces and a split, tubular coupling portion formed integrally with one of said surfaces and insertable, upon spring-like compression thereof, into said tubular recess so as to be retained therein.

In accordance with a preferred embodiment of the present invention, the replaceable element is constituted by an insert seating shim having an outer, substantially planar face upon which the insert is to be supported.

In accordance with another embodiment of the present invention, the replaceable element is constituted by a cutting insert.

Thus, with a metal cutting tool in accordance with the invention, the insert seating shim or cutting insert is integrally formed with means (the split, tubular coupling portion) facilitating its ready, secure, releasable mounting in the tool holder pocket without the necessity of providing for separate retaining means.

BRIEF SUMMARY OF THE DRAWINGS

For a better understanding of the present invention, and to show how the same may be carried out in practice, reference will now be made to the accompanying drawings, in which.

DETAILED DESCRIPTION OF PREFERRED EMBODIMENTS

Figure 1:
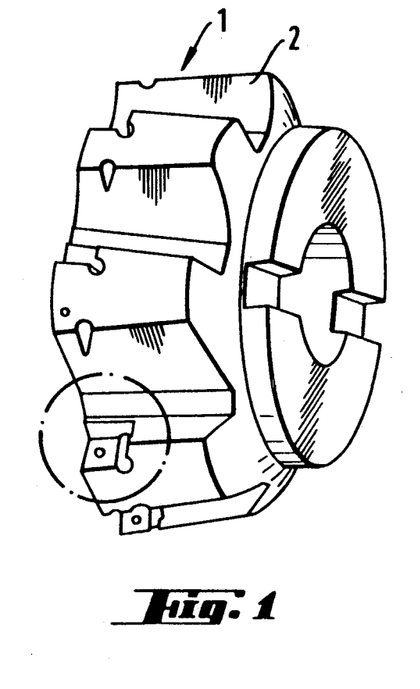
FIG. 1 is a perspective view of a rotary milling head (prior to the mounting thereon of cutting inserts) and constituting a cutting tool in accordance with the present invention.
Figure 2:
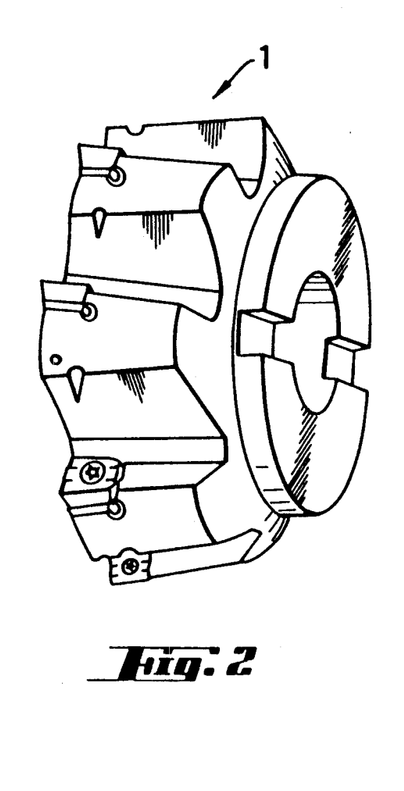
FIG. 2 is a perspective view of the milling head shown in FIG. 1 with the cutting inserts mounted into position.
Figure 3:
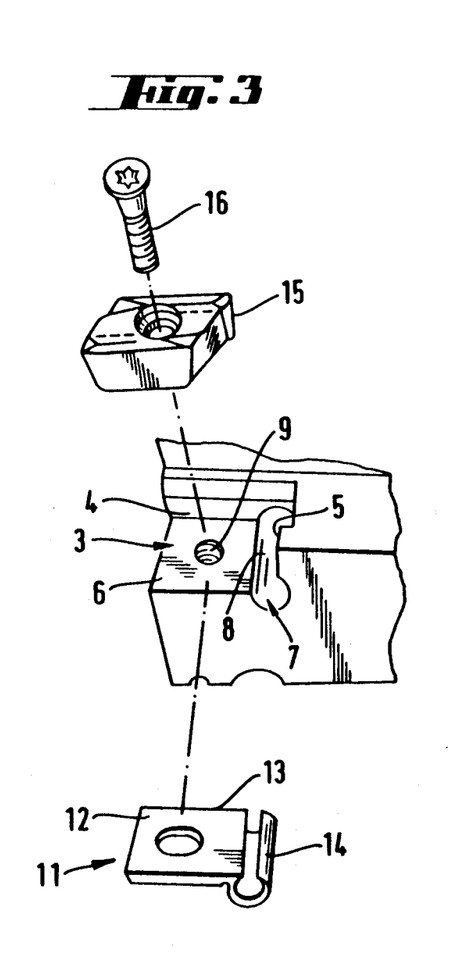
FIG. 3 is an exploded view on an enlarged scale of a detail of the cutting tool shown in FIG. 2.

Reference will now be made to FIGS. 1, 2 and 3 of the drawings, which illustrate the application of the invention to a cutting tool in the form of a substantially standard milling cutter head 1 which is formed with a plurality of peripherally distributed recesses 2, each recess having formed therein an insert retaining pocket 3 shown clearly in FIG. 3 of the drawings. Each pocket 3 is defined by a pair of side walls 4 and 5 and a base wall 6. An elongated tubular recess 7 is formed at the junction of the side wall 5 and the base wall 6 and opens into the pocket 3 via an elongated slot 8 which is codirectional with the linear junction of the side wall 5 and the base wall 6. Extending centrally into the base wall 6 is a tapped aperture 9.

Figure 4:
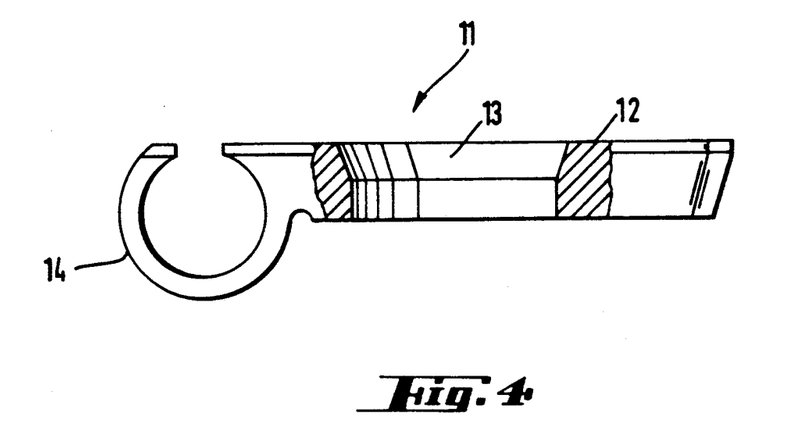
FIG. 4 is a partially sectioned side elevation of the insert seating shim shown in FIG. 3.
Figure 5:
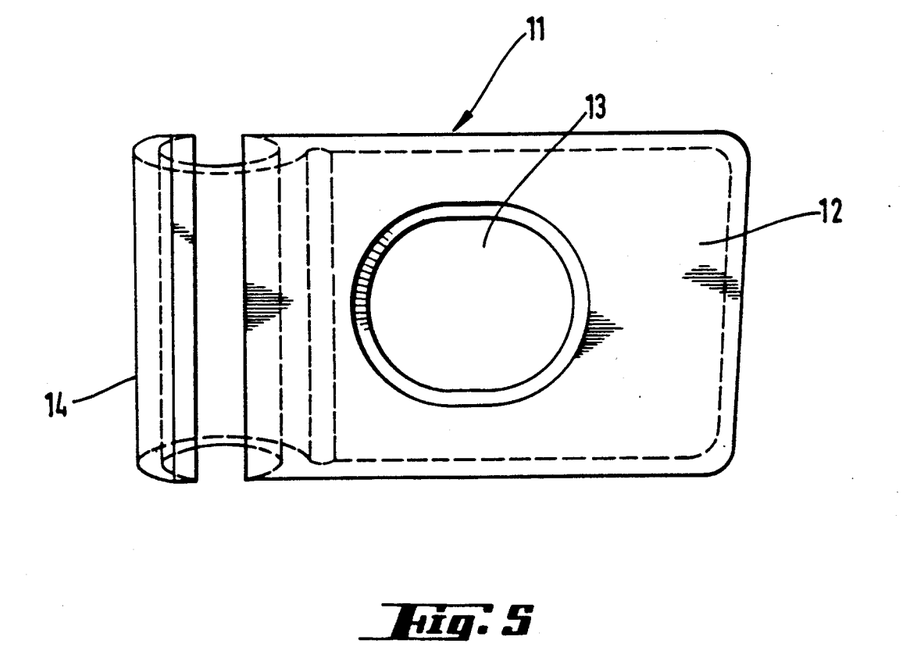
FIG. 5 is a plan view from above of the seating shim shown in FIG. 4.

An insert seating shim 11 is constituted by a substantially rectangular planar base portion 12 having outer, base and side surfaces and which substantially corresponds in shape and area to the base wall 6 of the pocket 3 and in which is formed a central, through-going aperture 13. Formed integrally with a side edge of the base portion 12 is a split, tubular side portion 14 which is coextensive with the edge to which it is connected.

In order to retainably locate the seating shim 11 in position in the pocket 3, the tubular side portion 14 is springily compressed and is inserted into the tubular recess 7 with the planar portion 12 projecting through the elongated slot 8. In this position, the seating shim 11 is securely retained within the pocket and is ready to have placed thereon a cutting insert 15 which is clamped thereto and to the milling head by means of a clamping screw 16. FIG. 2 shows the milling head provided with cutting inserts, each of which is seated on a seating shim of the kind shown and described with reference to FIG. 3 of the drawings.

Figure 6:
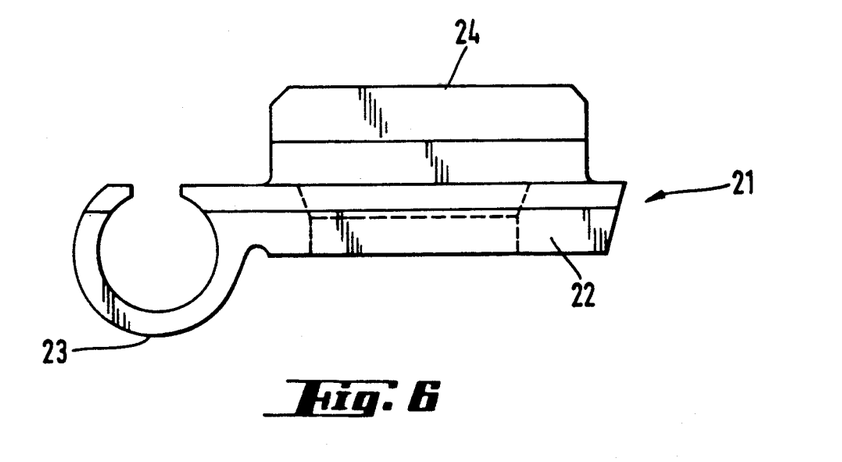
FIG. 6 is a side elevation of a further form of insert seating shim in accordance with the invention.
Figure 7:
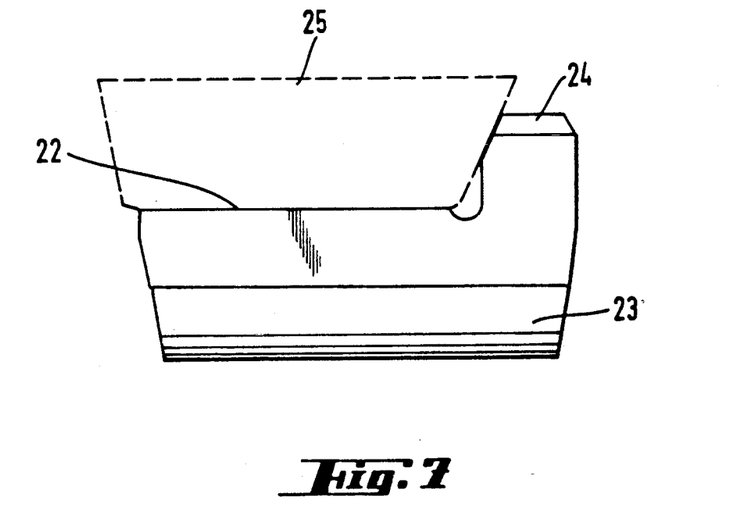
FIG. 7 is a front elevation of the seating shim shown in FIG. 6.
Figure 8:
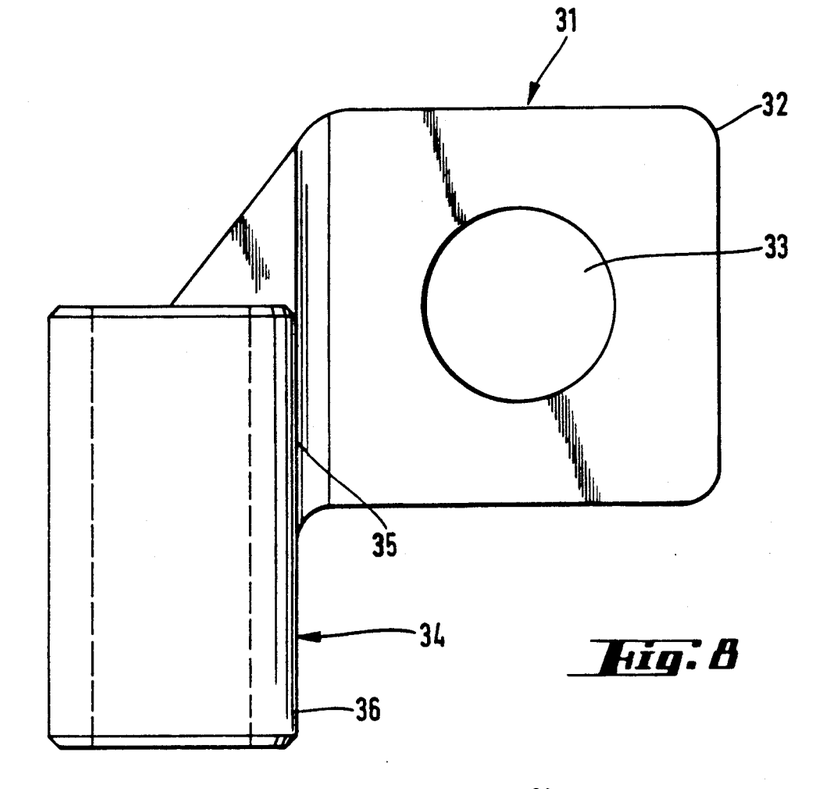
FIG. 8 is a plan view from above of a modified form of the seating shim in accordance with the present invention.
Figure 9:
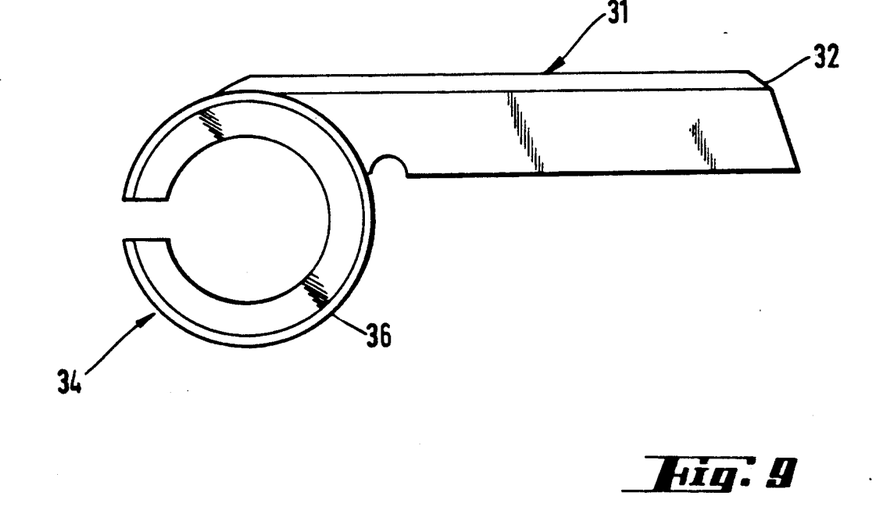
FIG. 9 is a side view of the seating shim shown in FIG. 8.
Figure 10:
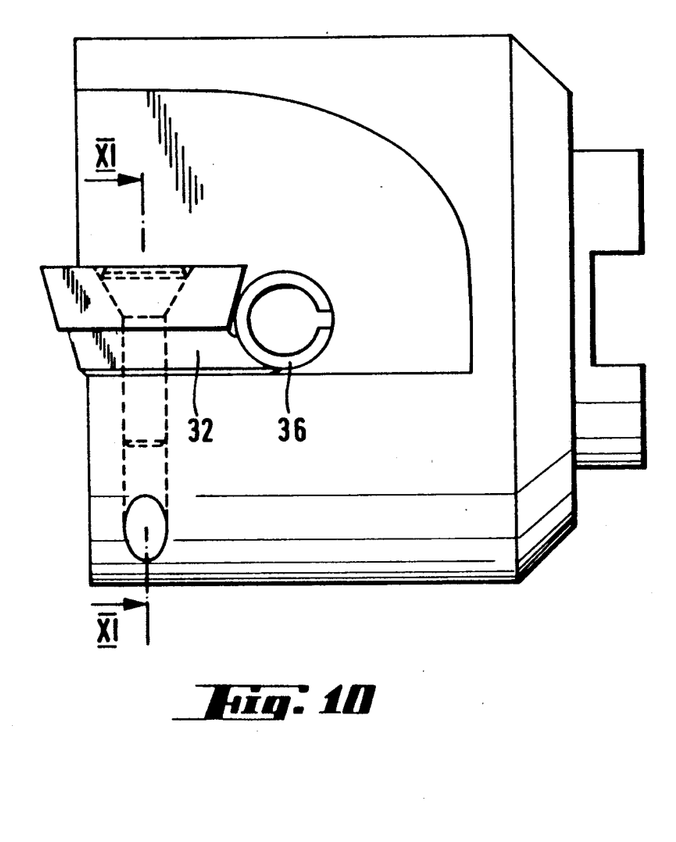
FIG. 10 is a side view of a milling head with a cutting insert shown seated on a seating shim as shown in FIGS. 8 and 9 of the drawings.

FIGS. 6 and 7 of the drawings show a modified form of seating shim 21 having, as before, a substantially planar, rectangular base portion 22 and a split, tubular side portion 23. Additionally, the seating shim is formed integrally with an edge thereof perpendicular to the tubular side portion 23 with an abutment shoulder 24 against which an insert 25 is designed to abut when the shim is retainingly placed in position in the pocket 3.

Figure 11:
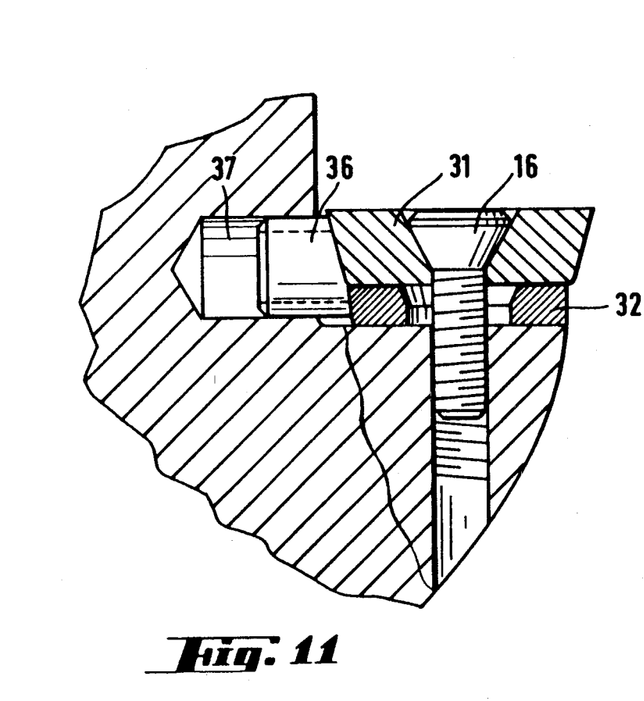
FIG. 11 is a cross-sectional view of a portion of the milling head shown in FIG. 10 taken along the line XI—XI.

In the embodiment shown in FIGS. 8 through 11 of the drawings, the seating shim is, as in the embodiment shown in FIGS. 6 and 7, provided with an insert abutment shoulder but in the case of this embodiment, the abutment shoulder is constituted by a portion of the split, tubular side portion. As seen in FIGS. 8 through 11, an insert seating shim 31 comprises a substantially rectangular base portion 32 having a through-going aperture 33 and having a split, tubular side portion 34 formed integrally with a side edge thereof. As distinct from the embodiment previously described, in the present embodiment the tubular side portion 34 is not coextensive with the edge of the base portion with which it is integral, but is constituted by a first section 35 which is formed integrally with a portion of the side edge of the base portion 32 and a second section 36 which projects beyond the side edge of the base portion 32. As seen in FIG. 11 of the drawings, a tool pocket 3' is formed with an inwardly extending tubular recess 37 into which the tubular side portion section 36 is inserted so as to retain in position the shim 31 within the pocket 3'. As can be clearly seen in FIG. 10 of the drawings, with this construction the tubular side portion section 36 constitutes an abutment shoulder for an insert 15 which rests on the seating shim 31 and is secured thereto by the clamping screw 16.

Figure 12:
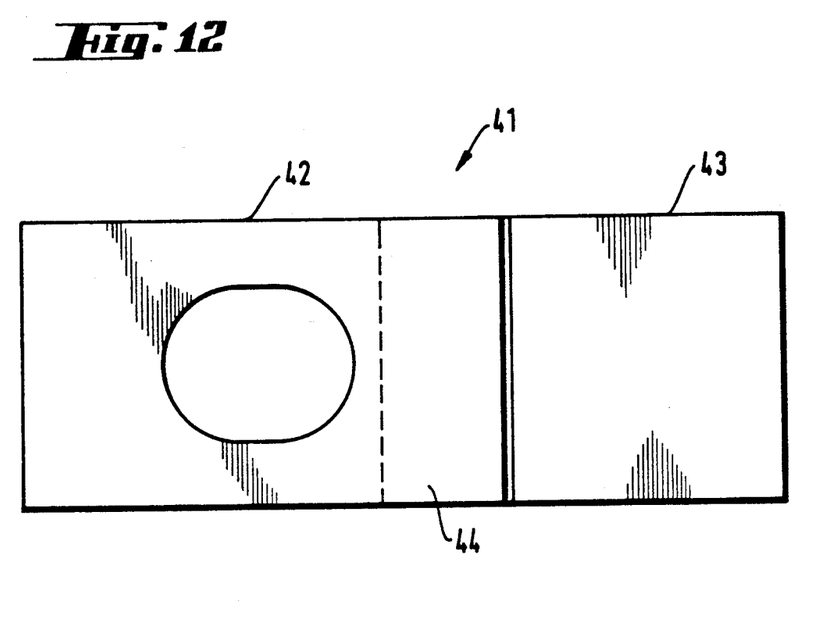
FIG. 12 is a plan view of a seating shim blank.
Figure 13:
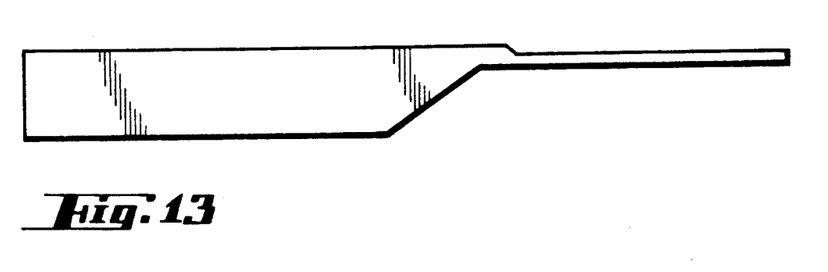
FIG. 13 is a side view of the seating shim blank shown in FIG. 12.
Figure 14:
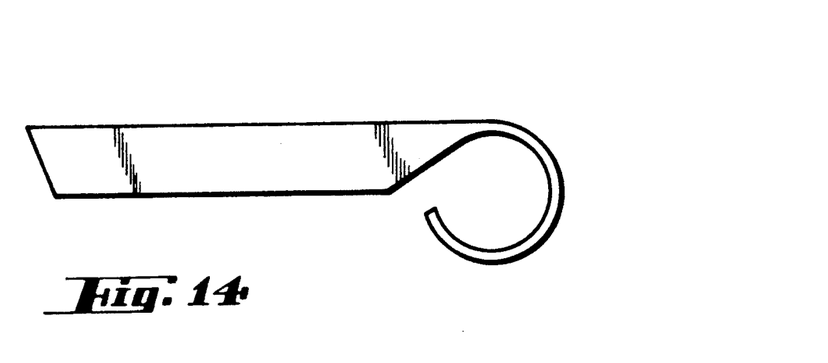
FIG. 14 is a side view of the seating shim formed from the blank shown in FIGS. 12 and 13.

Whilst in the embodiments specifically described above, the seating shim together with its integrally formed side portion are produced by suitable casting, in the embodiment shown in FIGS. 12, 13 and 14 of the drawings a seating shim blank 41 constituted by a substantially rectangular base portion 42, with which is integrally formed a side blank 43 also of substantially rectangular shape. The side blank 43 is joined to the base portion 42 via an intermediate tapering portion 44. As can be clearly seen in FIG. 14 of the drawings, when the side blank 43 is bent into a substantially circular shape, it effectively constitutes the split, tubular side portion which can be used, upon insertion into a corresponding tubular recess, for the retention of the seating shim in the pocket.

Figure 15:
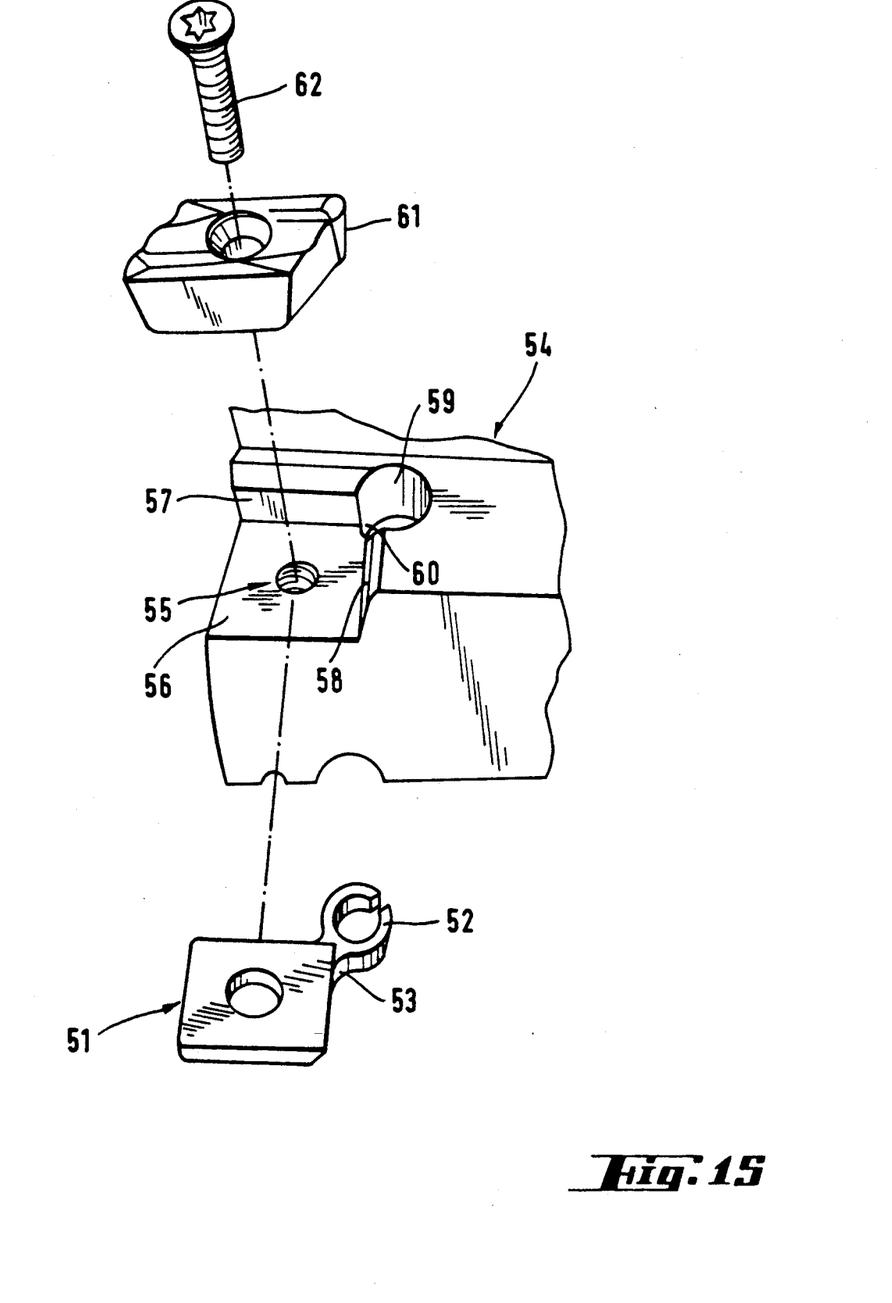
FIG. 15 is an exploded view corresponding to that shown in FIG. 3 of the drawings, wherein a modified form of seating shim and tool holder are shown.

In the modification shown in FIG. 15 of the drawings, a seating shim 51 is formed with a split tubular coupling element 52 which is integral with a corner of the seating shim 51 via a neck portion 53. As before, a tool holder 54 is formed with a retaining pocket 55 defined by a base wall 56 and a pair of side walls 57 and 58. At the intersection of the walls 57 and 58 is formed a tubular recess 59 which opens into the pocket via a narrow slot 60.

In order to retainably locate the seating shim 51 in position in the pocket 55, the tubular coupling element 52 is springily compressed and is inserted into the tubular recess 59 with the neck portion 53 projecting through the slot 60. In this position, the seating shim 51 is securely retained within the pocket 55 and is ready to have placed thereon a cutting insert 61 which is clamped thereto and to the tool holder 54 by means of a clamping screw 62.

Figure 16:
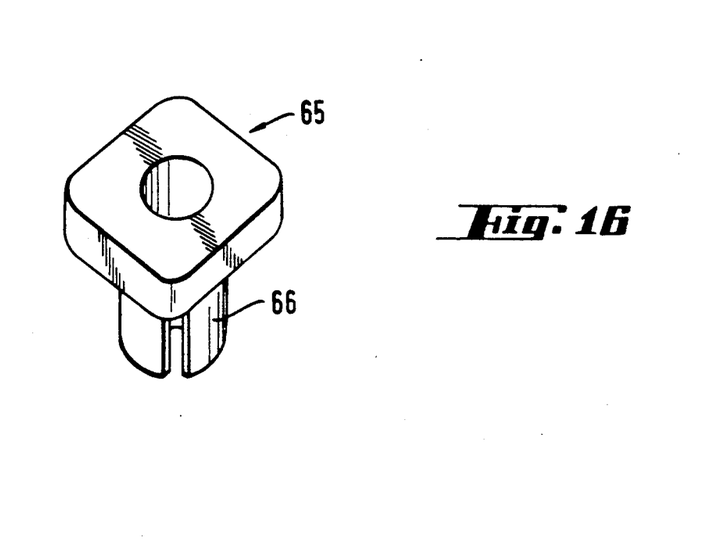
FIG. 16 is a perspective view of a still further form of seating shim.
Figure 17:
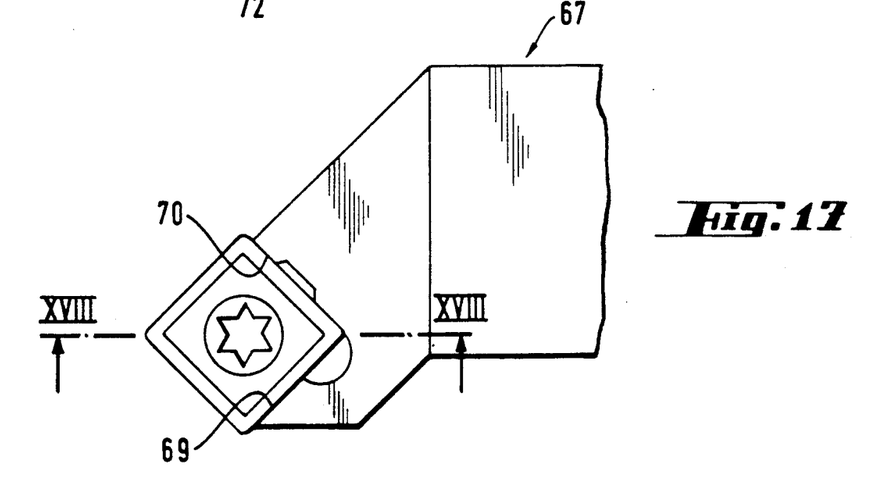
FIG. 17 is a plan view from above of a cutting tool incorporating a seating shim as shown in FIG. 16 of the drawings.
Figure 18:
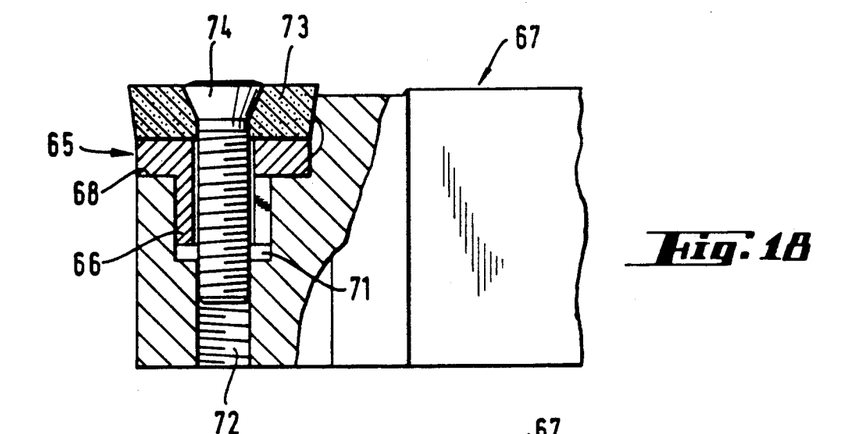
FIG. 18 is a longitudinally sectioned view of the cutting tool shown in FIG. 17 taken along the line XVIII—XVIII.

In the further modification shown in FIGS. 16, 17 and 18 of the drawings, a seating shim 65 is formed with a central, downwardly depending, split tubular coupling element 66. A tool holder 67 (in this example, of a turning or grooving tool) is formed with a pocket having a base wall 68 and a pair of side walls 69 and 70. A tubular recess 71 is formed in the base wall 68 corresponding in crosssectional shape to that of the coupling element 66, this tubular recess being coaxial with and constituting an extension of a tapped clamping bore 72.

The seating shim 65 is placed in position within the pocket by springily compressing the tubular coupling element 66 which is then inserted into the correspondingly shaped tubular recess 71 to prevent relative rotational displacement of the seating shim 65 with respect to the tool holder 67. A cutting insert 73 is placed on the seating shim 65 with a pair of side walls thereof abutting the side walls 69 and 70 of the pocket. The insert 73 and seating shim 65 are then clamped in position by means of a clamping screw 74 which is screwed into the clamping bore 72.

Whilst in the embodiments specifically described and illustrated above the seating shim has been provided with a throughgoing aperture it will be readily appreciated that this is not essential seeing that retention and clamping is quite independent of a throughgoing screw or bolt. Furthermore, whilst the invention has been specifically described when applied to milling tools the invention is equally applicable in the case of other cutting tools such as those used in turning, drilling and parting off operations and the like.

Although the invention has been specifically described as applied to an insert seating shim, the principle underlying the retention means as described with reference to the seating shim can be readily applied to the retention of the cutting insert itself. Thus, the cutting insert can be provided with an integrally formed split tubular coupling element which can be retained within a corresponding tubular recess formed in the tool holder. In this connection, inserts with integrally formed, split tubular coupling elements corresponding in general shape to the shims shown in FIGS. 4, 5; FIG. 15; and FIGS. 16, 17 and 18, can be employed.

It will be readily appreciated that, by virtue of the specific construction of the seating shim in accordance with the present invention and its use in conjunction with metal cutting tools provided with an appropriate recess for receiving the integrally formed tubular attachment of the seating shim, the disadvantages accompanying the use of known seating shims, such as the necessity for providing separate attaching means, are completely avoided or overcome.

We claim:

1. A metal cutting tool comprising a tool holder; a pocket in said tool holder defined by side and base walls; an elongated tubular recess formed in said tool holder and opening into said pocket; an insert seating shim supported on said base wall and having a base portion comprising upper, base and side surfaces and a split, tubular coupling element formed integrally with and projecting from said shim and insertable upon spring-like compression thereof into said tubular recess so as to be retained therein.

2. A metal cutting tool according to claim 1, wherein said split, tubular, coupling element is formed integrally with a side surface of the shim.

3. A metal cutting tool according to claim 2, wherein said recess extends into said tool holder in a direction away from said pocket and substantially colinear with a linear junction of said base wall and said side wall and wherein said tubular coupling element includes a first section projecting beyond said base portion and spring insertable into said recess and a second section extending along at least part of the length of said side surface and constituting an insert abutment shoulder.

4. A metal cutting tool according to claim 2, wherein said recess opens into said pocket via an elongated slot adjacent to and codirectional with a linear junction of said base wall and a side wall.

5. A metal cutting tool according to claim 4, wherein said shim is formed at a side edge thereof with an insert abutment shoulder directed substantially normally with respect to the shim base surface and transversely with respect to the tubular coupling element.

6. A metal cutting tool according to claim 1, wherein the insert seating shim comprises a planar base portion and a split, tubular side portion formed integrally with a side edge of the base portion.

7. A metal cutting tool according to claim 6, wherein said planar base portion of the insert seating shim is formed, at a side edge thereof, transverse to said tubular side portion with an insert abutment shoulder directed substantially normally with respect to said base portion.

8. A metal cutting tool according to claim 6, wherein said tubular side portion of the insert seating shim includes a first section projecting beyond said base portion and a second section extending along at least part of the length of said side edge of the base portion and constituting an insert abutment shoulder.

9. A metal cutting tool according to claim 6, wherein the base portion is formed with a throughgoing aperture.

10. A metal cutting tool according to claim 1, wherein said base portion of the insert seating shim is planar and is provided, at a corner thereof, with said split, tubular, coupling element.

11. A metal cutting tool according to claim 10, wherein said planar base portion of the insert seating shim is provided, at a corner thereof, with said split, tubular, coupling element.

12. A metal cutting tool according to claim 1, wherein said seating shim is provided with said split, tubular, coupling element which extends centrally and downwardly with respect to the base surface thereof and wherein said elongated tubular recess is formed in the base wall of said tool holder.

13. A metal cutting tool according to claim 12, wherein it is provided with a split, tubular, coupling element which extends centrally therefrom.

* * * * *